US009569455B1

(12) United States Patent
Bono et al.

(10) Patent No.: US 9,569,455 B1
(45) Date of Patent: Feb. 14, 2017

(54) DEDUPLICATING CONTAINER FILES

(71) Applicant: EMC Corporation, Hopkinton, MA (US)

(72) Inventors: Jean-Pierre Bono, Westborough, MA (US); William C. Davenport, Burlington, MA (US); Miles A. de Forest, Bahama, NC (US); Philippe Armangau, Acton, MA (US); Walter C. Forrester, Berkeley Heights, NJ (US); Karl M. Owen, Chapel Hill, NC (US); Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 649 days.

(21) Appl. No.: 13/930,010

(22) Filed: Jun. 28, 2013

(51) Int. Cl.
*G06F 17/30* (2006.01)

(52) U.S. Cl.
CPC ............... *G06F 17/30156* (2013.01)

(58) Field of Classification Search
CPC .............. G06F 17/30156; G06F 17/30489; G06F 2201/84; G06F 3/0641
See application file for complete search history.

(56) References Cited

U.S. PATENT DOCUMENTS

| | | | |
|---|---|---|---|
| 7,254,685 B1 | 8/2007 | Cardente | |
| 7,631,155 B1 | 12/2009 | Bono et al. | |
| 7,694,191 B1 * | 4/2010 | Bono | G06F 11/004 |
| | | | 714/48 |
| 7,769,722 B1 * | 8/2010 | Bergant | G06F 11/2097 |
| | | | 707/681 |
| 7,870,105 B2 | 1/2011 | Arakawa et al. | |
| 8,190,850 B1 * | 5/2012 | Davenport | G06F 17/30067 |
| | | | 711/170 |
| 8,433,869 B1 | 4/2013 | Natanzon et al. | |
| 2004/0158766 A1 * | 8/2004 | Liccione | G06F 11/2023 |
| | | | 714/4.11 |
| 2007/0233979 A1 * | 10/2007 | Beardsley | G06F 11/2069 |
| | | | 711/162 |
| 2009/0313503 A1 | 12/2009 | Atluri et al. | |

(Continued)

OTHER PUBLICATIONS

Bono, "Unified Datapath Architecture," U.S. Appl. No. 13/828,322, filed Mar. 14, 2013.

(Continued)

*Primary Examiner* — James Trujillo
*Assistant Examiner* — Fatima Mina
(74) *Attorney, Agent, or Firm* — BainwoodHuang

(57) ABSTRACT

A technique forms contents of a deduplication container from a standalone container file system stored on the same data storage array on which the deduplication container is stored. Such a standalone container includes a container file which is formed by standalone blocks that are not shared with any other file within the standalone container outside of snapshots of that file. The standalone blocks store host data and which are hierarchically related to each other. Upon receiving a deduplication command, the storage processor carries out a set of deduplication operations which include creating and storing the deduplication container in the data storage array. The deduplication container includes container files which are formed by deduplication blocks storing the host data and which are hierarchically related to each other.

22 Claims, 14 Drawing Sheets

(56) References Cited

U.S. PATENT DOCUMENTS

| | | | | |
|---|---|---|---|---|
| 2010/0082547 | A1* | 4/2010 | Mace | G06F 11/1435 707/648 |
| 2010/0094847 | A1* | 4/2010 | Malan | H04L 69/18 707/705 |
| 2011/0302195 | A1* | 12/2011 | Cai | G06F 17/30923 707/769 |
| 2012/0158672 | A1* | 6/2012 | Oltean | G06F 17/30091 707/692 |
| 2013/0054524 | A1* | 2/2013 | Anglin | G06F 17/30575 707/624 |
| 2013/0086324 | A1* | 4/2013 | Soundararajan | G06F 12/0813 711/122 |
| 2013/0159257 | A1* | 6/2013 | Rao | G06F 11/14 707/649 |

OTHER PUBLICATIONS

Bono, et al., "Unified Datapath Processing With Virtualized Storage Processors," U.S. Appl. No. 13/828,294, filed Mar. 14, 2013.
Bono, et al., "Recovering Performance of a File System Post-Migration," U.S. Appl. No. 13/832,695, filed Mar. 15, 2013.
Bono, et al., "Unified Data Protection for Block and File Objects," U.S. Appl. No. 13/853,508, filed Mar. 29, 2013.
Bono, et al., "File System Inline Fine Grained Tiering," U.S. Appl. No. 13/928,591, filed Jun. 27, 2013.
Bono, et al., "Data Storage System With Unified System Cache," U.S. Appl. No. 13/930,164, filed Jun. 28, 2013.
Bono, et al., "Unified Data Services for Block and File Objects," U.S. Appl. No. 13/853,284, filed Mar. 29, 2013.
Bono, et al., "File System Over Fully Provisioned Volume File in Direct Mode," U.S. Appl. No. 13/931,757, filed Jun. 28, 2013.
Bono, et al., "File System Snapshots Over Fully Provisioned Volume File in Direct Mode," U.S. Appl. No. 13/931,764, filed Jun. 28, 2013.
Bono, et al., "File System Over Thinly Provisioned Volume File in Mapped Mode," U.S. Appl. No. 13/931,769, filed Jun. 28, 2013.
Bono, et al., "File System Snapshots Over Thinly Provisioned Volume File in Mapped Mode," U.S. Appl. No. 13/931,775, filed Jun. 28, 2013.
Bono, et al., "File System Shrink for Directly and Thinly Provisioned File Systems," U.S. Appl. No. 13/929,879, filed Jun. 28, 2013.
Bono, et al., "Managing Host Data Placed in a Container File System on a Data Storage Array Having Multiple Storage Tiers," U.S. Appl. No. 13/929,019, filed Jun. 28, 2013.
Bono, et al., "Compressing Container Files," U.S. Appl. No. 13/930,684, filed Jun. 28, 2013.
Bono, et al., "Transaction Logging Using File-System-Specific Log Files," U.S. Appl. No. 14/230,831, filed Mar. 31, 2014.
Bono, et al., "Preserving File Handles When Moving File System Operation Between Storage Processors," U.S. Appl. No. 14/229,323, filed Mar. 28, 2014.
Bono, et al., "Snap and Replicate for Unified Datapath Architecture," U.S. Appl. No. 14/319,622, filed Jun. 30, 2014.
Bono, et al., "Techniques for Providing Access to a Virtualized Block Storage Device Over a File-Based Network Storage Protocol," U.S. Appl. No. 14/319,739, filed Jun. 30, 2014.
Bono, et al., "Auxiliary Files in a Container File System," U.S. Appl. No. 14/319,634, filed Jun. 30, 2014.
Bono, et al., "Reclaiming Space From File System Hosting Many Primary Storage Objects and Their Snapshots," U.S. Appl. No. 14/319,455, filed Jun. 30, 2014.
Bono, et al., "File System Version Set Infrastructure," U.S. Appl. No. 14/319,602, filed Jun. 30, 2014.
Bono, et al., "Proactive Scavenging of the File System SNAPS," U.S. Appl. No. 14/319,660, filed Jun. 30, 2014.
Bono, et al., "Accessing File System Replica During Ongoing Replication Operations," U.S. Appl. No. 14/492,241, filed Sep. 22, 2014.
Bono, et al., "Storing Compressed and Uncompressed Data in Blocks Having Different Allocation Unit Sizes," U.S. Appl. No. 14/497,814, filed Sep. 26, 2014.

* cited by examiner

1500

Initially storing a standalone container on the data storage array, the standalone container including standalone files which are formed by non-shared blocks storing the host data and which are hierarchically related to each other
1502

Receiving a deduplication command which identifies the standalone container
1504

In response to the deduplication command, performing a set of deduplication operations to create and store a deduplication container on the data storage array, the deduplication container including deduplication files which are formed by sharable blocks storing the host data and which are hierarchically related to each other
1506

*FIG. 15*

DEDUPLICATING CONTAINER FILES

BACKGROUND

Block-based data storage systems conventionally include programming and hardware structures to provide block based access to storage volumes. Such systems typically support Fibre Channel, iSCSI (Internet Small Computer System Interface), and/or other block-based protocols. With any of these block-based protocols, a data storage system may receive IO (input/output) requests from "hosts," i.e., computing devices accessing the data storage system, where the IO requests (also called "host IOs") specify locations to be read from or written to in the form of LUN identifiers (logical unit number, or volume) and particular offset ranges relative to the LUNs. For responding to IOs that specify read requests, the data storage system typically maps the specified LUNs and offsets to particular locations on disk drives or electronic flash drives, reads the data stored at the mapped locations, and returns the data to the hosts. For responding to IOs that specify write requests, the data storage system performs similar mappings, but writes the data to the designated locations. The IO requests may return results indicating whether the write requests succeeded or failed. An example of a block-based data storage system which operates in a manner similar to that described above is the CLARiiON® system from EMC Corporation of Hopkinton, Mass.

File-based data storage systems are also known in the art. These systems include programming and hardware structures to provide file based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system which operates in a manner similar to that described above is the Celerra® system from EMC Corporation of Hopkinton, Mass.

SUMMARY

The designs of block-based and file-based data storage systems often follow parallel paths. Indeed, it has been recognized that many of the features provided by block-based storage, such as replication, snaps, de-duplication, migration, failover, and non-disruptive upgrade, are similar to features provided for file-based data storage systems. Because of the different ways that block-based systems and file-based systems are typically constructed, however, it can be difficult to transfer advances in features for block-based systems to file-based systems, and vice-versa.

For user convenience, block-based and file-based storage systems are sometimes co-located, essentially side-by-side, to allow processing of both block-based and file-based host IOs in a single combined system. Such combined systems are often more difficult to support and maintain, however, than block-based or file-based systems individually. In addition, such systems tend to produce "stranded storage," i.e., storage that has been freed but cannot be reused because only an object of the same type (block-based or file-based) can reuse the storage but no current demand for storage from an object of the same type is pending. Such stranded storage can accumulate in these combined systems, allowing valuable storage resources to go unutilized.

In contrast with the separate block-based and file-based designs of conventional systems, an improved data storage array combines both block-based and file-based functionality in a unified data path architecture. The improved data storage array brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file.

In an example, the improved data storage array increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Inefficiencies of stranded storage are thus greatly reduced or altogether eliminated.

Moreover, in the context of deduplication in a data storage system, contents of a deduplication container are formed from a standalone container file system stored on the same data storage array on which the deduplication container is stored. For example, suppose that a standalone container includes a container file which is formed by standalone blocks. The standalone blocks store host data and which are hierarchically related to each other. Upon receiving a deduplication command, the storage processor carries out a set of deduplication operations which include creating and storing the deduplication container in the data storage array. The deduplication container includes container files which are formed by deduplication blocks storing the host data and which are hierarchically related to each other.

In accordance with improvements hereof, certain embodiments directed to a method of performing deduplication on a data storage array that stores host data. The method includes initially storing a standalone container on the data storage array, the standalone container including container files which are formed by standalone blocks storing the host data and which are hierarchically related to each other. The method also includes receiving a deduplication command which identifies the standalone container. The method further includes performing, in response to the deduplication command, a set of deduplication operations to create and store a deduplication container on the data storage array, the deduplication container including container files which are formed by deduplication blocks storing the host data and which are hierarchically related to each other.

In some arrangements, performing the set of deduplication operations involves assigning a virtual block map (VBM) pointer to each standalone block that is not marked as a duplicate to form a deduplication block, and, for each standalone block marked as a duplicate, i) assigning a VBM pointer to another VBM pointer that points to a standalone block that is not marked as a duplicate and contains the same host data as that standalone block, and ii) freeing that standalone block.

In some arrangements, performing the set of deduplication operations further involves establishing a replication session between the standalone container and the deduplication container, and, after establishing the replication session, replicating a volume file and snapshots of the volume file of the standalone container in the deduplication container. Also, freeing each standalone block involves removing the standalone container from the data storage array.

In some arrangements, the standalone container includes a particular file and a set of snapshots of the particular container file, each of the set of snapshots being identified with an elapsed time since creation. Also, establishing the replication session involves locating an oldest snapshot of the set of snapshots, the oldest snapshot being identified with the longest elapsed time since creation, and identifying subsequent snapshots in descending order of elapsed time since creation.

In some arrangements, replicating the full contents of the standalone container in the deduplication container involves replicating the oldest snapshot in the deduplication container, and for each subsequent snapshot, i) forming a difference between that subsequent snapshot and the previous snapshot, ii) replicating the difference in the deduplication container, and iii) adding the replicated difference to the replicated previous snapshot to form a replicated subsequent snapshot. Further, removing the standalone container from the data storage array involves deleting the set of snapshots from the standalone container.

In some arrangements, the standalone container includes an external replication session having a replication configuration between the container file of the standalone container and a replicated container file on another data storage array. The method further involves prior to removing the standalone container from the data storage array, i) pausing the external replication session and ii) copying the replication configuration of the external replication session to the deduplication container, deleting the replication configuration from the standalone container, and establishing another external replication session between the deduplication container and the replicated standalone container.

In some arrangements, the standalone container includes an external replication session having a replication configuration between the standalone container as a source object and a replicated standalone container as a destination object on another data storage array. Also, the standalone container acts as a source file system and the other data storage array as a target file system, the standalone container having a replication configuration between the standalone container and the replicated standalone container on another data storage array. Further, establishing the replication session includes setting up a symmetric replication session involving the external replication session and the deduplication container. Also, the method further includes prior to removing the standalone container from the data storage array, establishing a failover condition in the standalone container, the failover condition causing the deduplication container to act as the source object, and deleting the replication configuration from the standalone container.

In some arrangements, the data storage array includes an upper deck file system accessible to a host and a lower deck file system including the standalone container and the deduplication container, the upper deck file system being stored in the form of a container file. Also, receiving the deduplication command which identifies the standalone container includes obtaining a message from the host indicating that the container file of the standalone container is to be converted into a container file of the deduplication container.

In some arrangements, the lower deck file system is provisioned blocks of data from a storage pool, the storage pool containing all blocks of storage of the data storage array, a single deduplication container being stored per storage pool. Also, performing the set of deduplication operations to create and store the deduplication container on the data storage array involves verifying whether there is another deduplication container stored in the lower deck file system prior to creating the deduplication container.

Additionally, some embodiments of the improved technique are directed to a data storage apparatus constructed and arranged to perform deduplication on a data storage array that stores host data. The data storage apparatus includes a set of storage devices and a storage processor. The storage processor includes memory and a set of processors coupled to the memory to form controlling circuitry. The controlling circuitry is constructed and arranged to carry out the method of performing deduplication on a data storage array that stores host data.

Furthermore, some embodiments of the improved technique are directed to a computer program product having a non-transitory computer readable storage medium which stores code including a set of instructions which, when executed by a computer, cause the computer to carry out the method of performing deduplication on a data storage array that stores host data.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 15 is a flowchart illustrating an example method of carrying out the improved technique in the data storage apparatus of FIG. 1.

DETAILED DESCRIPTION

Overview

Embodiments of the invention will now be described. It is understood that such embodiments are provided by way of example to illustrate various features and principles of the invention, and that the invention hereof is broader than the specific example embodiments disclosed.

In the context of a data deduplication facility in a data storage system, container files in a deduplication container are formed from a standalone container file system stored on the same data storage array on which the deduplication container is stored. For example, suppose that a standalone container includes a container file which is formed by standalone blocks. The standalone blocks store host data and which are hierarchically related to each other. Upon receiving a deduplication command, the storage processor carries out a set of deduplication operations which include creating and storing the deduplication container in the data storage array. The deduplication container includes container files which are formed by deduplication blocks storing the host data and which are hierarchically related to each other.

Data Storage Array Details

Figure 1:
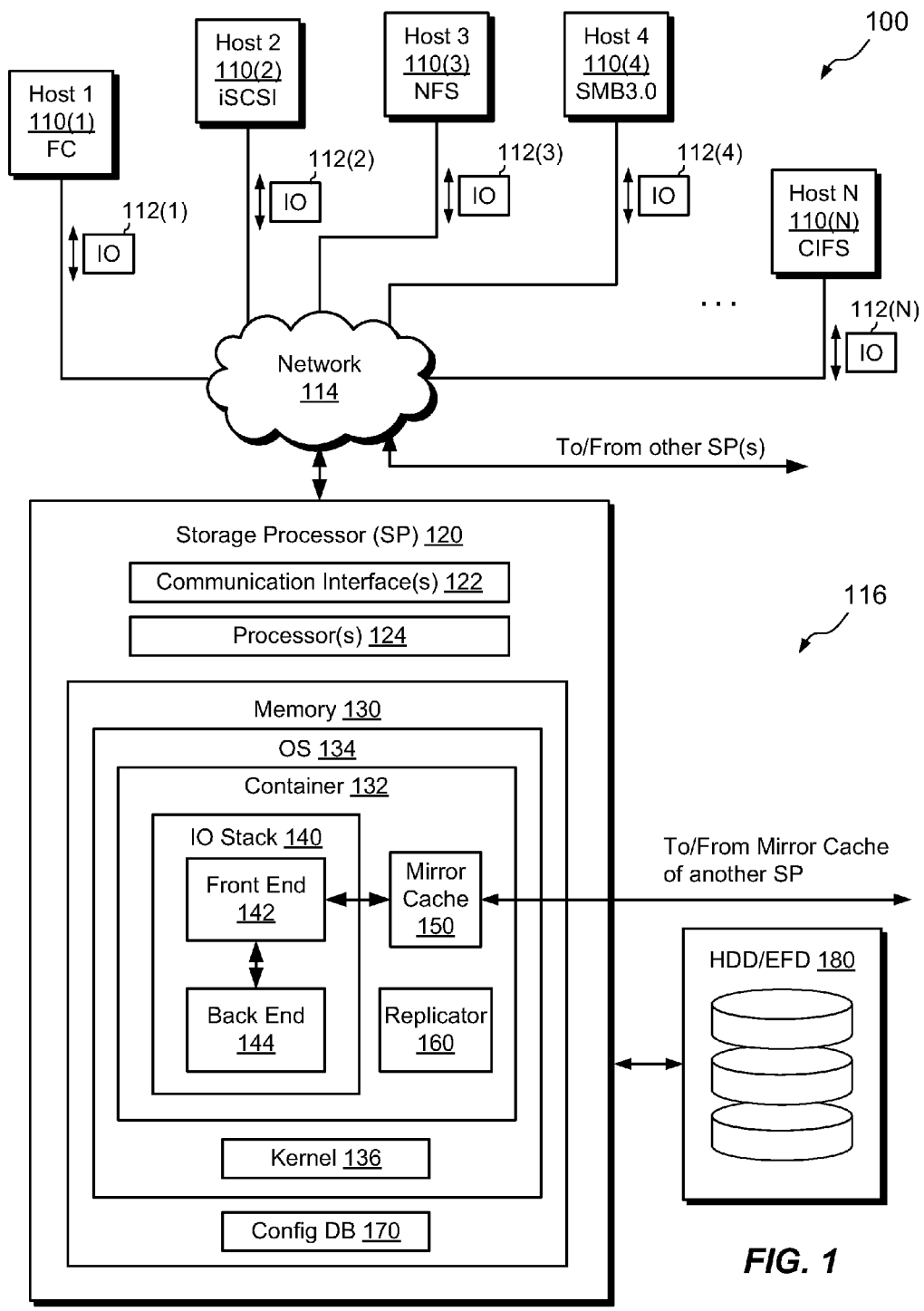
FIG. 1 is a block diagram showing an example storage processor of a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus (or array) 116 over a network 114. The data storage apparatus 116 includes a storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
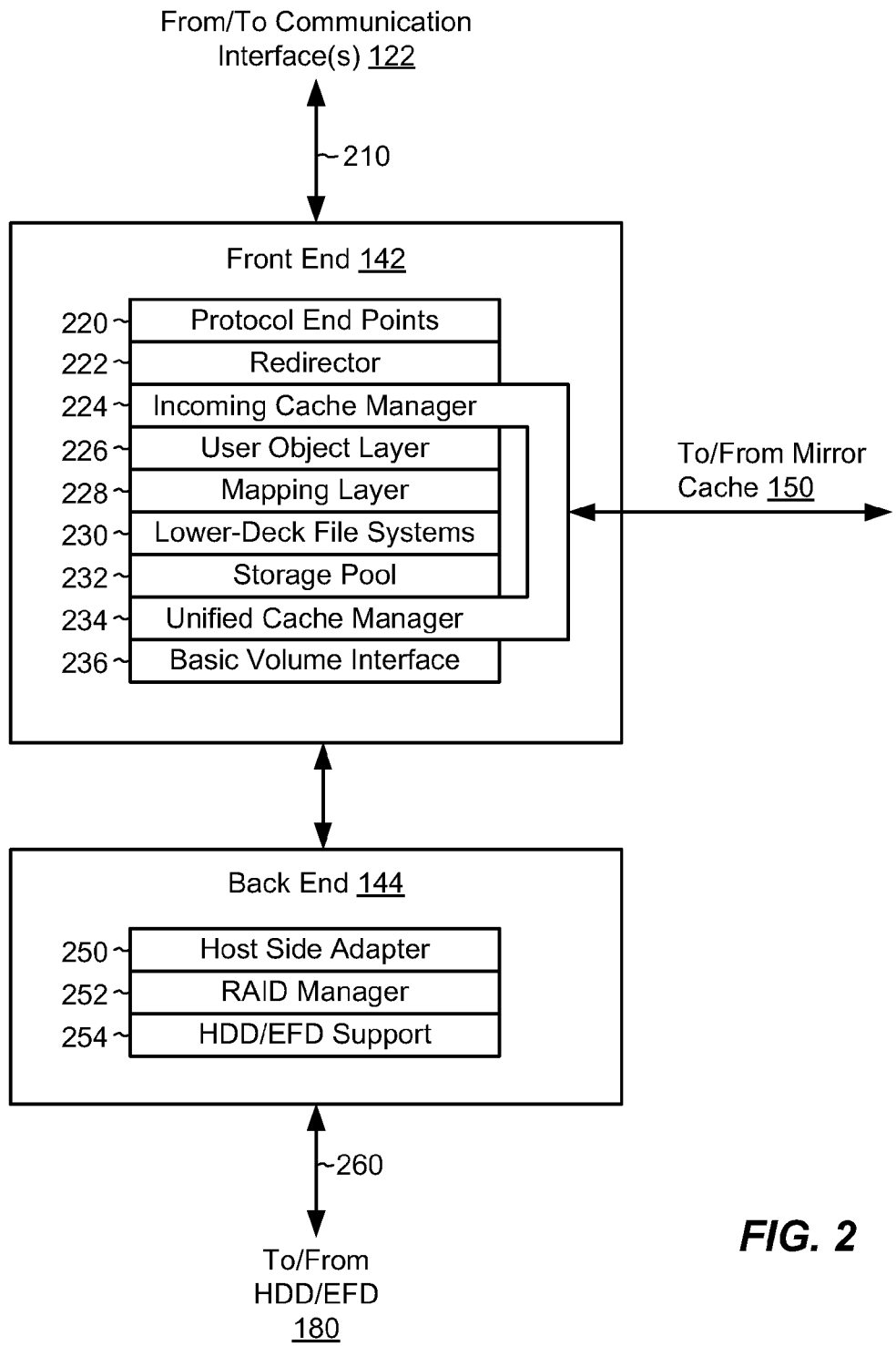
FIG. 2 is a block diagram showing particular example features of the storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
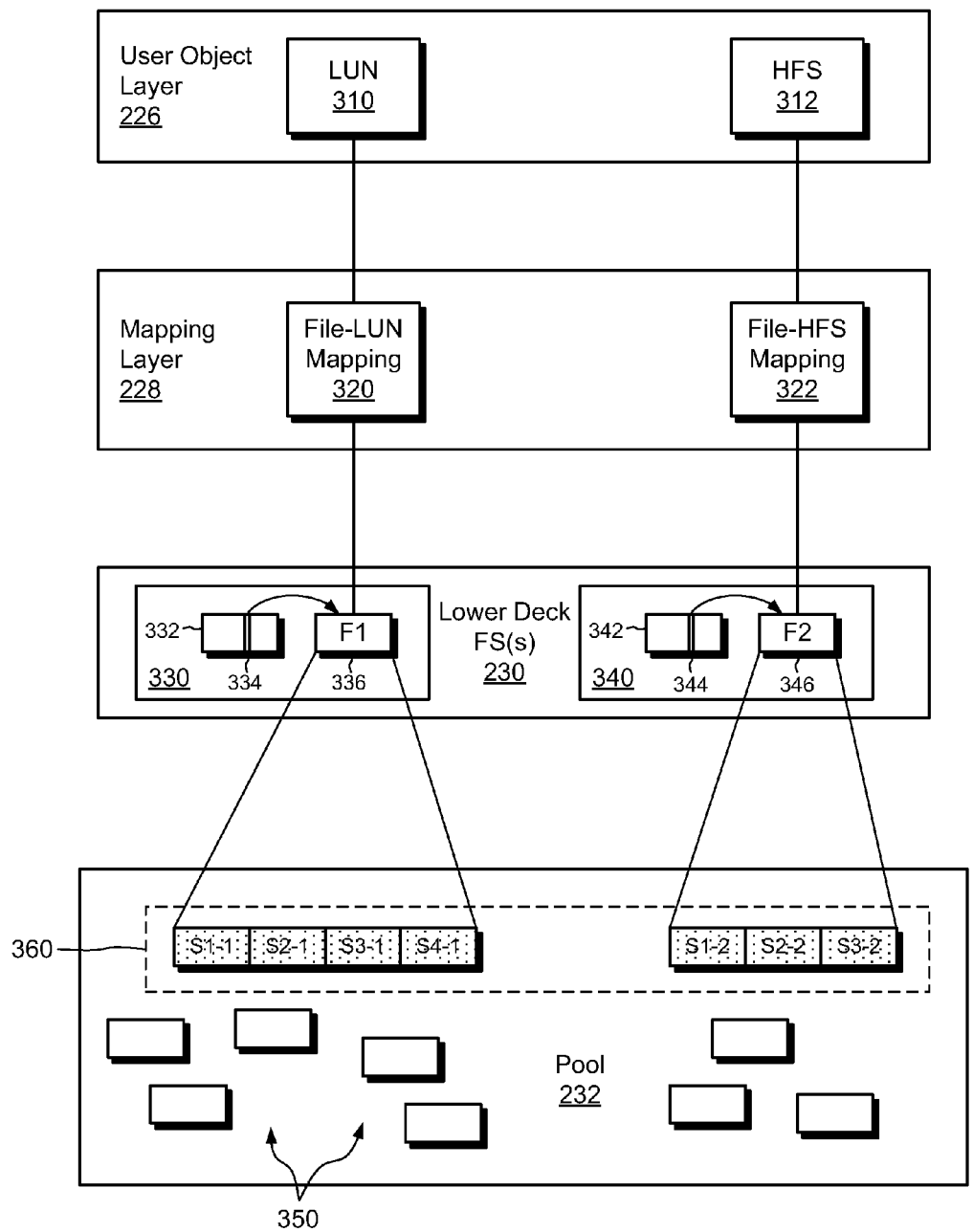
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310 and of an HFS (host file system) 312, and the mapping layer 228 includes a file-to-LUN mapping 320 and a file-to-HFS mapping 322. The file-to-LUN mapping 320 maps the LUN 310 to a first file F1 (336), and the file-to-HFS mapping 322 maps the HFS 312 to a second file F2 (346). Through the file-to-LUN mapping 320, any set of blocks identified in the LUN 310 by a host IO is mapped to a corresponding set of blocks within the first file 336. Similarly, through the file-to-HFS mapping 322, any file or directory of the HFS 312 is mapped to a corresponding set of blocks within the second file 346.

The first file 336 and the second file 346 are included within the lower-deck file systems 230. In this example, a first lower-deck file system 330 includes the first file 336 and a second lower-deck file system 340 includes the second file 346. Each of the lower-deck file systems 330 and 340 includes an inode table, 332 and 342, respectively. The inode tables 332 and 342 provide information about files in respective lower-deck file systems in the form of inodes. For example, the inode table 332 of the first lower-deck file system 330 includes an inode 334, which provides file-specific information about the first file 336. Similarly, the inode table 342 of the second lower-deck file system 340 includes an inode 344, which provides file-specific information about the second file 346. The information stored in each inode includes location information (e.g., block locations) where the respective file is stored, and may thus be accessed as metadata to identify the locations of the files 336 and 346.

Although a single file is shown for each of the lower-deck file systems 330 and 340, it is understood that each of the lower-deck file systems 330 and 340 may include any number of files, each with its own entry in the respective inode table. In one example, each lower-deck file system stores not only the file F1 or F2 for the LUN 310 or HFS 312, but also snaps of those objects. For instance, the first lower-deck file system 330 stores the first file 336 along with a different file for every snap of the LUN 310. Similarly, the second lower-deck file system 340 stores the second file 346 along with a different file for every snap of the HFS 312.

As shown, a set of slices 360 is allocated by the storage pool 232 for storing the first file 336 and the second file 346. In the example show, slices S1-1 through S4-1 are used for storing the first file 336, and slices S1-2 through S3-2 are used for storing the second file 346. The data that make up the LUN 310 are thus stored in the slices S1-1 through S4-1, whereas the data that make up the HFS 312 are stored in the slices S1-2 through S3-2. In an example, the storage pool 232 allocates slices 350 to the set of file systems 230 in an on-demand manner, e.g., as the first file 236 and the second file 246 require additional storage. The storage pool 232 can also deallocate slices from the set of file systems 230 when all the currently allocated slices are no longer required.

In some examples, each of the lower-deck file systems 330 and 340 is associated with a respective volume, such as a sparse LUN. Sparse LUNs provide an additional layer of mapping between the lower-deck file systems 230 and the pool 232 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4A:
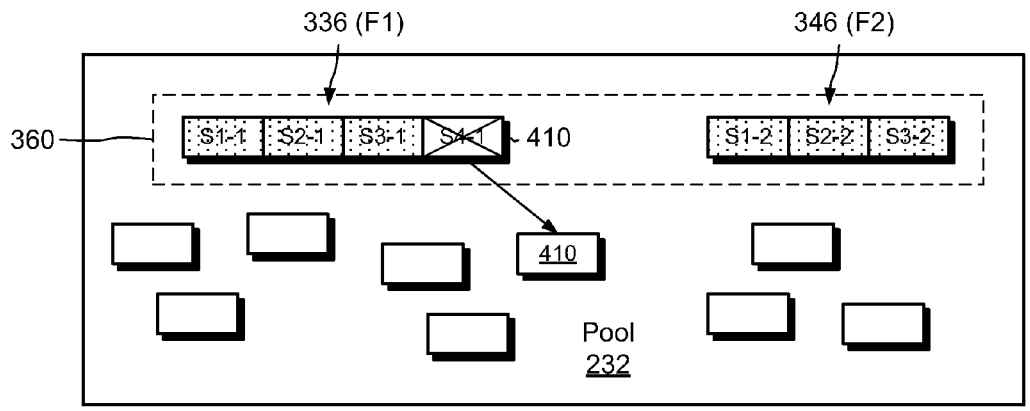
FIGS. 4A-4C are a series of block diagrams showing an example way in which a slice used to store a first file representing a LUN is reallocated for use by a second file representing a host file system.
Figure 4B:
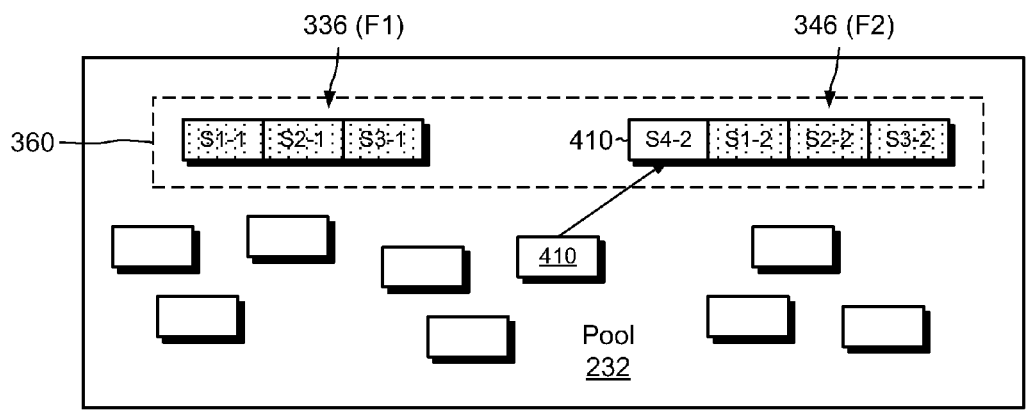
Figure 4C:
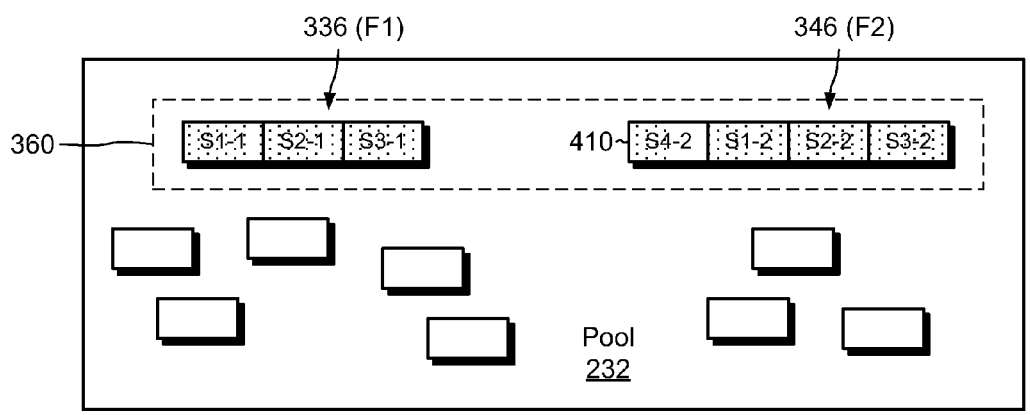

FIGS. 4A-4C show a sequence of events for reusing a slice 410 that once stored portions of the first file 336 for storing portions of the second file 346 when the slice 410 is no longer required by the first file 336. In FIG. 4A, it is shown that slice S4-1 (also labeled 410), which previously stored data for the first file 336, has become empty. This may occur, for example, when data is deleted from the LUN 310. In response to the slice S4-1 (410) becoming empty, the storage pool 232 deallocates the slice 410 from the set of file systems 230 and makes the slice 410 available.

In FIG. 4B, the free slice 410 is reallocated to the set of file systems 230 for use by the second file 346. Thus, the slice 410 becomes a newly added slice S4-2. In an example, the pool 232 reallocates the slice 410 to the set of file systems in response to the second file 346 requiring additional storage. This may occur, for example, in response to the HFS 312 growing to accommodate additional, or larger, files.

In FIG. 4C, with the first file 346 still storing data for the LUN 310, the slice 410 has become part of the second file 346 (as slice S4-2) and additional data for the second file 346 are stored on the newly acquired slice.

In the manner shown, a slice first used by the LUN 310 is reused by the HFS 312. Thus, storage space originally used for storing block-based data is reused for storing file-based data. Although FIGS. 4A-4C show block-based storage being reused for file-based storage, it is evident that file-based storage can also be reused for block-based storage. For example, the slice 410 can be released from the second file 346 and reused by the first file 336. Thus, inefficiencies of stranded storage are significantly reduced or eliminated.

Figure 5:
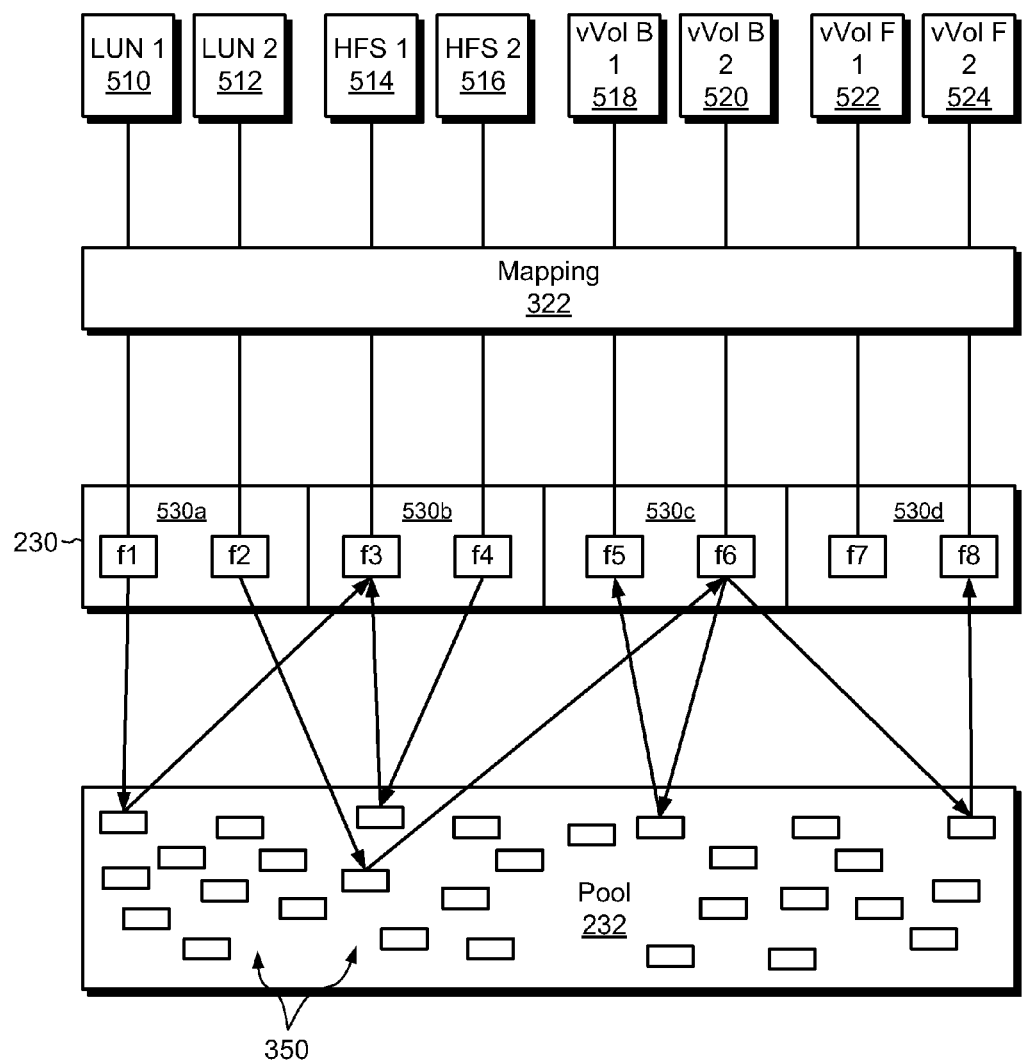
FIG. 5 is a block diagram showing an example manner in which storage slices from the storage pool can be reused by different files of the lower-deck file systems.

FIG. 5 shows a flexible manner in which files of lower-deck file systems can store a variety of host objects and how slices can be readily reused across different files. Here, files f1 and f2 within a lower-deck file system 530a store file representations of LUNs 510 and 512. Also, files f3 and f4 within a lower-deck file system 530b store file representations of host file systems 514 and 516. Additional host objects are stored, including block-based vVols 518 and 520 in files f5 and f6 (in a lower-deck file system 530c), and file-based vVols 522 and 524 in files f7 and f8 (in a lower-deck file system 530d). As is known, vVols are virtual storage volumes that are associated with particular virtual machines. In an example, any of the hosts 110(1-N) may run a virtual machine, which references a vVol stored on the data storage apparatus 116.

As illustrated with the arrows extending between the files f1 through f8 and slices 350 in the pool 232, slices used for any of the files f1 through f8 can be deallocated when they are no longer needed and reallocated for use with other files as those files require additional storage. As all host objects (e.g., LUNs, host file systems, block-based vVols, or file-based vVols) are represented as files, slices may be readily exchanged among them. Stranded storage is thus avoided for all of these host object types.

Figure 6A:
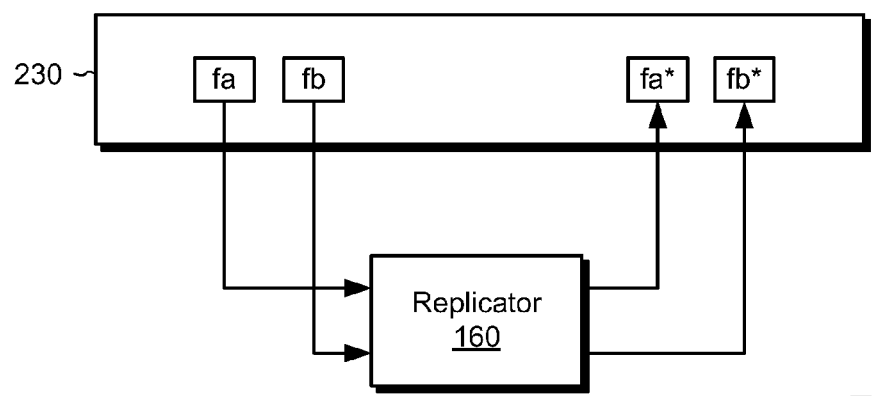
FIGS. 6A and 6B show different example replication operations on files of a lower-deck file system.
Figure 6B:
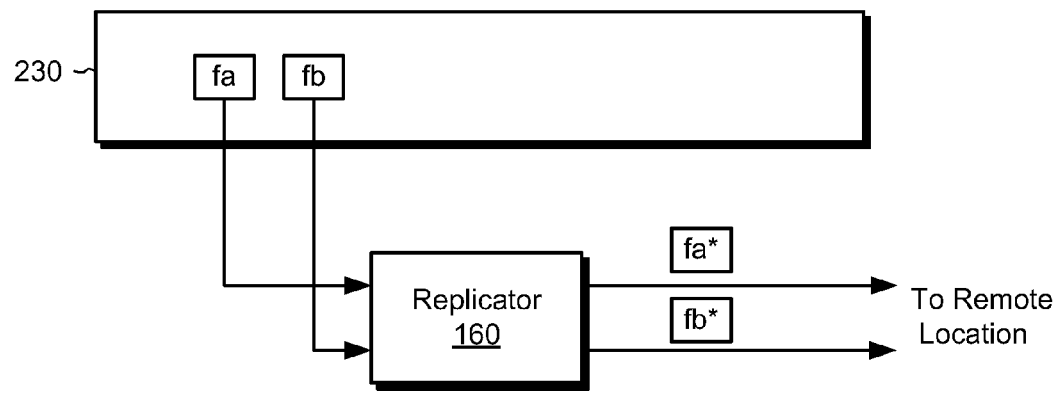

FIGS. 6A and 6B show different uses of the replicator 160. The replicator 160 performs data protection operations on host objects by copying and/or snapping their underlying files to local and/or remote locations.

In FIG. 6A, the replicator 160 copies or snaps a file "fa," which represents a LUN in the set of file systems 230 to produce another file "fa*" in the set of file systems 230. The file "fa*" may be a copy or a snap of the file "fa." The replicator 160 also copies or snaps a file "fb," which represents a host file system in the set of file systems 230 to produce another file "fb*" in the set of file systems 230. As shown, the same replicator 160 performs similar functions (file copies) in both situations, for providing data protection for both a LUN and a host file system.

In FIG. 6B, the replicator 160 performs similar copy and/or snap operations on the files "fa" and "fb," but in this case provides copies or snaps "fa*" and "fb*" to a remote location, i.e., a location remote from the data storage apparatus 116. The remote copies and/or snaps thus provide data protection for the LUN represented by "fa" and for the host file system represented by "fb" even in the event of a natural disaster in the vicinity of the data storage apparatus 116.

In some examples, the replicator 160 can operate in both a "sync" mode and an "async" mode. In sync mode, the replicator 160 performs a remote replication "in sync" with receiving write IO requests. For example, in response to a host IO request specifying data to be written, the replicator 160 attempts to write the host data to a remote storage point (e.g., to a RecoverPoint Appliance) and only acknowledges the write back to the originating host after both the write to the remote storage point and the local write have been acknowledged. In async mode, by contrast, a host IO request specifying a write is acknowledged back to the originating host as soon as the host data are successfully received (e.g., as soon as they are stored in the mirror cache 150 and mirrored to another SP). A local or remote copy is then made of the host object (LUN, host file system, etc.) asynchronously, i.e., out of band, with incoming write IO requests.

Although not specifically shown, other functions besides replication are also greatly simplified by representing LUNs, file systems, and other host objects in the form of files. For example, functions such as snapping, de-duplication, migration, failover, and non-disruptive upgrade are similarly benefited by the ability to commonly treat host objects as files.

In addition to the operations described above, the SP 210 can also perform advanced data services. For example, the configuration database 170 (FIG. 1) may store records defining one or more virtualized storage processors. A "virtualized storage processor" is a collection of definitions, file systems, settings, and interfaces, which can be instantiated on an SP (i.e., on a physical SP) to realize an entity that acts like its own SP. Multiple virtualized storage processors can be instantiated on a physical SP (e.g., the SP 210) to effectively multiply the number of storage processors of the data storage apparatus 116.

Figure 7:
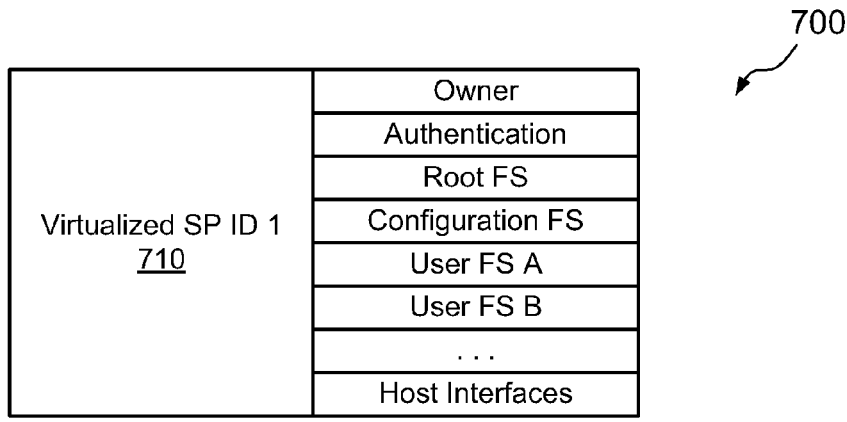
FIG. 7 is a table showing an example set of records stored in a configuration database that defines a virtualized storage processor that can be run on the storage processor of FIG. 1.

FIG. 7 shows an example set of records 700 in the configuration database 170 that define a virtualized storage processor 710. The records specify, for example, an owning SP, authentication, and file system identifiers for the virtualized storage processor 710, including identifiers of a root file system, a configuration file system, and various user file systems that may be accessed using the virtualized storage processor 710. The records may further specify various host interfaces that define host IO protocols that the virtualized storage processor 710 is equipped to handle.

The set of records 700 thus identifies not only user file systems, but also a set of interfaces and settings that form a "personality." This personality enables the virtualized storage processor 710 to interact with hosts in a manner similar to the way a physical storage processor interacts with hosts.

Although the set of records 700 is shown to define only a single virtualized storage processor 710, it is understood that the configuration database 170 may store any number of virtualized storage processor definitions for instantiating any number of virtualized storage processors on the data storage apparatus 116. The virtualized storage processors are instantiated with their respective host interfaces, and can each respond to host IO requests for reading and writing data of their respective file systems, which data are stored in the storage 180.

It is understood that virtualized storage processors operate in connection with the front end 142 of the IO stack 140. The virtualized storage processors thus remain with their respective front ends 142 in modular and gateway arrangements. The file systems that belong to a virtualized storage processor are stored as files in the lower-deck file systems 230, in the manner described above for host file systems. Indeed, in some arrangements, all host file systems implemented in the data storage apparatus 116 belong to one or more virtualized storage processors and are accessed through the virtualized storage processor(s). In some examples, multiple virtualized storage processors share the same front end IO stack 142. In other examples, each virtualized storage processor includes its own separate instance of the front end IO stack 142.

In an example, virtualized storage processors are instantiated within containers (e.g., container 132). For example, a single container may host any number of virtualized storage processors.

Figure 8A:
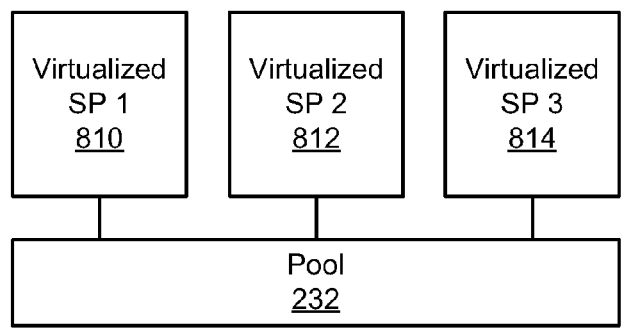
FIGS. 8A and 8B are block diagrams showing example arrangements of virtualized storage processors.
Figure 8B:
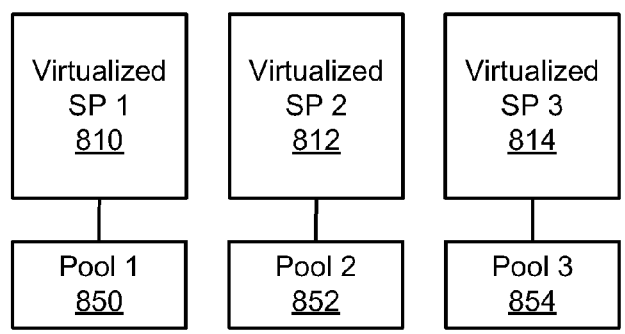

FIGS. 8A and 8B show two different example arrangements of virtualized storage processors. In both cases, the virtualized storage processors run within the container 132 of the memory 130.

In FIG. 8A, multiple virtualized storage processors 810, 812, and 814 access the storage pool 232. Thus, the lower-deck file systems of the virtualized storage processors 810, 812, and 814 all derive the slices needed to store their underlying files from the pool 232.

In FIG. 8B, multiple storage pools 850, 852, and 854 are provided, one for each of the virtualized storage processors 810, 812, and 814, respectively. Providing different pools for respective virtualized storage processors promotes data isolation among the virtualized storage processors, and thus may be better suited for applications involving multiple tenants which require that each tenant's data be kept separate from the data of other tenants.

Figure 9:
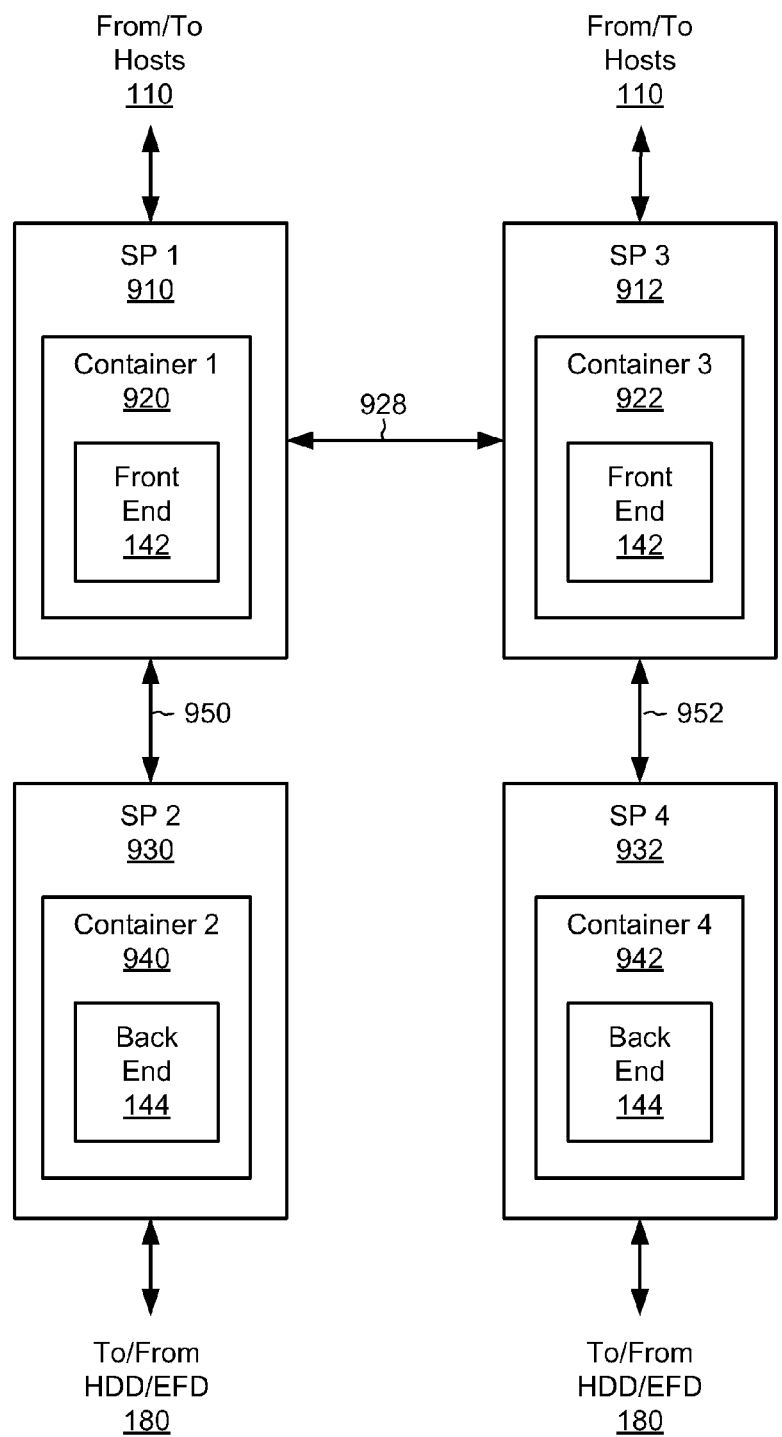
FIG. 9 is a block diagram showing an example arrangement involving three storage processors in a modular arrangement, where two storage processors are configured to run front ends and one storage processor is configured to run a back end.
Figure 10:
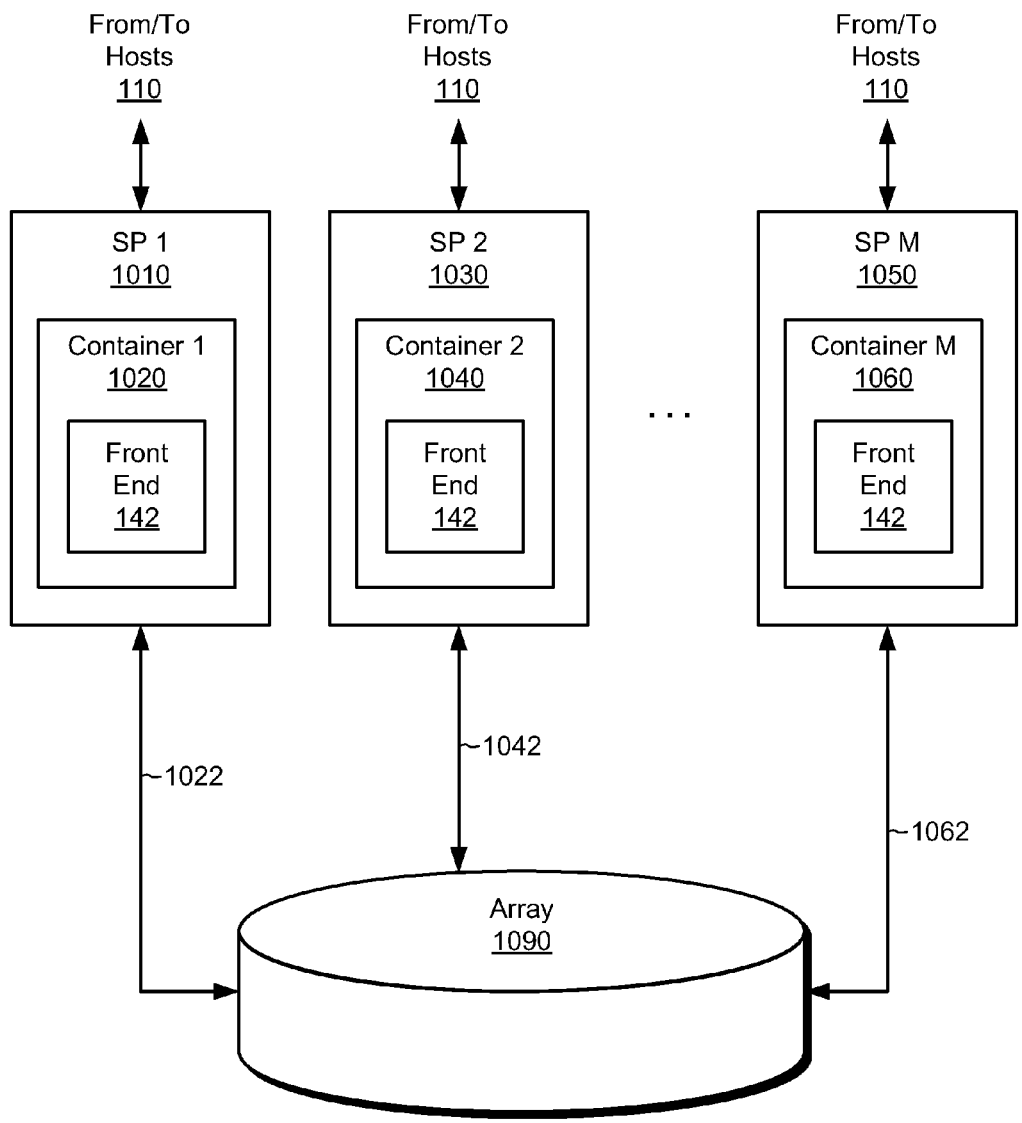
FIG. 10 is a block diagram that shows an example arrangement in which multiple storage processors run respective front ends and are connected in a gateway configuration to a data storage array.

FIGS. 9 and 10 show different deployments of the IO stack 140. In FIG. 9, a modular deployment is shown in which a first SP 910 houses a front end 142 in a first container 920 and a second SP 930 houses the back end 144 in a second container 940. An interconnection 950 is formed between the first SP 910 and the second SP 930. In an example, the interconnection 950 is made using Fibre Channel or some other block-based protocol. To support cache mirroring (via connection 928), as well as other functions, a parallel arrangement may be formed with a third SP 912 housing a front end 142 in a third container 922 and a fourth SP 932 housing a back end 144 in a fourth container 942. An interconnection 952 is formed between the third SP 912 and the fourth SP 932. With this arrangement, performance gains can be realized over the integrated configuration of FIG. 1, because the modular configuration dedicates the computing and memory resources of multiple SPs to handling host IOs, and because each SP is optimized for operating as a front end or as a back end but is not required to operate as both. Also, although the first SP 910, the second SP 930, the third SP 912, and fourth SP 932 are physical SPs, any of the SPs housing front ends 142 (SP1 and SP3) can themselves house any number of virtualized storage processors.

FIG. 10 shows a gateway arrangement, in which multiple SPs 1010, 1030, . . . , 1050 each house a front end 142 in respective containers 1020, 1040, . . . , 1060. Interconnections 1022, 1042, . . . , 1062 (such as Fibre Channel) respectively connect the SPs 1010, 1030, . . . , 1050 to an array 1090. The array 1090 includes its own internal back end, for responding to block-based IOs. Although three SPs are shown providing front ends 142, it is understood that a greater or lesser number of SPs providing front ends 142 may be provided. Also, cache mirroring and other functions may be best supported by providing SPs in pairs. Thus, the number of SPs in the gateway arrangement is preferably even. Suitable examples of the array 1090 include the VMAX® and VPLEX® storage arrays available from EMC Corporation of Hopkinton, Mass.

Figure 11:
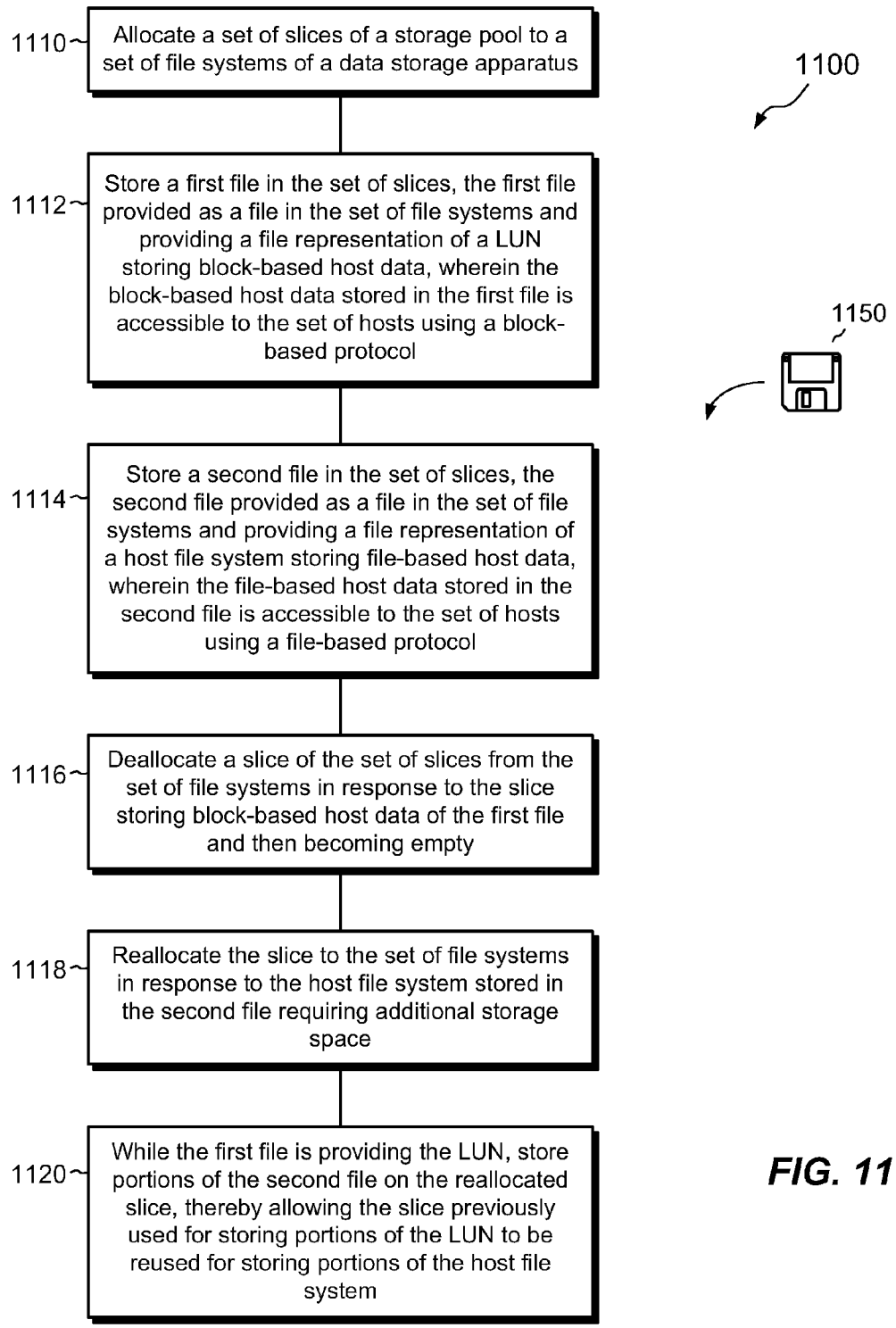
FIG. 11 is a flowchart showing an example process for managing host data of a set of hosts in the data storage apparatus of FIG. 1.

FIG. 11 shows an example method 1100 for managing host data of a set of hosts in a data storage apparatus. The method 1100 that may be carried out in connection with the data storage apparatus 116. The method 1100 is typically performed by the software constructs, described in connection with FIGS. 1 and 2, which reside in the memory 130 of the storage processor 110 and are run by the set of processors 124. The various acts of the method 1100 may be ordered in any suitable way. Accordingly, embodiments may be constructed in which acts are performed in orders different from those illustrated, which may include performing some acts simultaneously, even though the acts are shown as sequential in the illustrated embodiments.

At step 1110, a set of slices of a storage pool is allocated to a set of file systems of a data storage apparatus. For example, as shown in FIG. 3, the set of slices 360 is allocated to the lower-deck file systems 230 of the data storage apparatus 116. In other arrangements, the set of slices 360 are allocated to a single file system or to greater than two file systems (including all lower-deck file systems 230).

At step 1112, a first file is stored in the set of slices. The first file is provided as a file in the set of file systems and provides a file representation of a LUN storing block-based host data. The block-based host data stored in the first file is accessible to the set of hosts using a block-based protocol. For example, as shown in FIG. 3, the first file 336 is stored in the set of slices 360. The first file 336 is provided as a file in the file system 330 of the lower-deck file systems 230, via an entry in the inode table 332, and provides a file representation of the LUN 310, which stores block-based host data. Such host data is accessible to the hosts 110(1-N) using a block-based protocol, such as Fibre Channel or iSCSI.

At step 1114, a second file is stored in the set of slices. The second file is provided as a file in the set of file systems and provides a file representation of a host file system storing file-based host data. The file-based host data stored in the second file is accessible to the set of hosts using a file-based protocol. For example, as shown in FIG. 3, the second file 346 is stored in the set of slices 360. The second file 346 is provided as a file in the file system 340 of the lower-deck file systems 230, via an entry in the inode table 342, and provides a file representation of the host file system (HFS) 212, which stores file-based host data. Such host data is accessible to the hosts 110(1-N) using a file-based protocol, such as NFS, CIFS, or SMB 3.0.

At step 1116, a slice of the set of slices is deallocated from the set of file systems in response to the slice storing block-based host data of the first file and then becoming empty. For example, as shown in FIG. 4A, the slice 410 is deallocated from the lower-deck file systems 230 file systems in response to the slice 410 initially storing block-based host data for the LUN 310 (as slice S4-1) and then becoming empty, e.g., as a result of files being deleted from the LUN 310.

At step 1118, the slice is reallocated to the set of file systems in response to the host file system stored in the second file requiring additional storage space. For example, as shown in FIG. 4B, the slice 410, which was once used for storing portions of the LUN 310, is reallocated to the lower-deck file systems 230 in response to the HFS 312 requiring additional storage space.

At step 1120, while the first file is providing the LUN, portions of the second file are stored on the reallocated slice, thereby allowing the slice previously used for storing portions of the LUN to be reused for storing portions of the host file system. For example, as shown in FIG. 4C, the slice 410 stores portions of the HFS 312 in the second file 346, while the first file 336 continues to provide the LUN 310. Thus, the slice 410, which was once used to store portions of the LUN 310 is reused for storing portions of the HFS 312.

An improved technique has been described for a data storage apparatus that combines both block-based and file-based functionality in a unified data path architecture. The improved technique brings together IO processing of block-based storage systems and file-based storage systems by expressing both block-based objects and file-based objects in the form of files. These files are parts of an underlying, internal set of file systems, which are stored on a set of storage units served by a storage pool. Because block-based and file-based objects are all expressed as files of this set of file systems, a common set of services can be applied across block-based and file-based objects. Also, storage units released by any file or files of the underlying, internal set of file systems can be reused by any other file or files, regardless of whether the files represent LUNs, file systems, vVols, and so forth. Inefficiencies of stranded storage are thus greatly reduced or completely eliminated.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the lower-deck file systems 230 have been described as storing file representations of LUNs, host file systems, block-based vVols, file-based vVols, and snaps of any of the foregoing. These are merely examples, however. Other types of objects may be stored in the lower-deck file systems 230 as file representations, such as virtual hard disks (VHDs), virtual machine disks (VMDKs), internal file systems used by the data storage apparatus 116, and internal volumes, for example.

In addition, as shown and described, different types of objects (LUNs, host file systems, etc.) are shown and described as being stored in respective lower-deck file systems. This is merely an example, however. Alternatively, any of LUNs, host file systems, block-based vVols, and file-based vVols, as well as snaps of any of the foregoing, may be included together in a single lower-deck file system or in any number of lower-deck file systems. Thus, it is not required that files representing different types of objects be stored in different lower-deck file systems.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1150 in FIG. 11). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Performing Deduplication Operations while Preserving Snapshots and Replication Sessions The above-described storage processor 120 is capable of performing deduplication operations on standalone containers in a lower deck file system. In particular, storage processor 120, as part of a deduplication operation, is capable of creating and storing a deduplication container which contains container files that are formed by deduplication blocks. Standalone containers, on the other hand, have container files which are formed by standalone blocks that are not shared with any other file within the standalone container outside of snapshots of that file.

It should be understood that it is typically not feasible for deduplication to be carried out in a standalone container. Because files in a standalone container are formed from standalone blocks, the relocation of blocks involved in deduplication operations becomes overly taxing for storage processor to carry out. When blocks in a file are shared, however, then it becomes possible to centralize relocation notifications and thus greatly reduce the processor load involved in performing deduplication operations.

Figure 12:
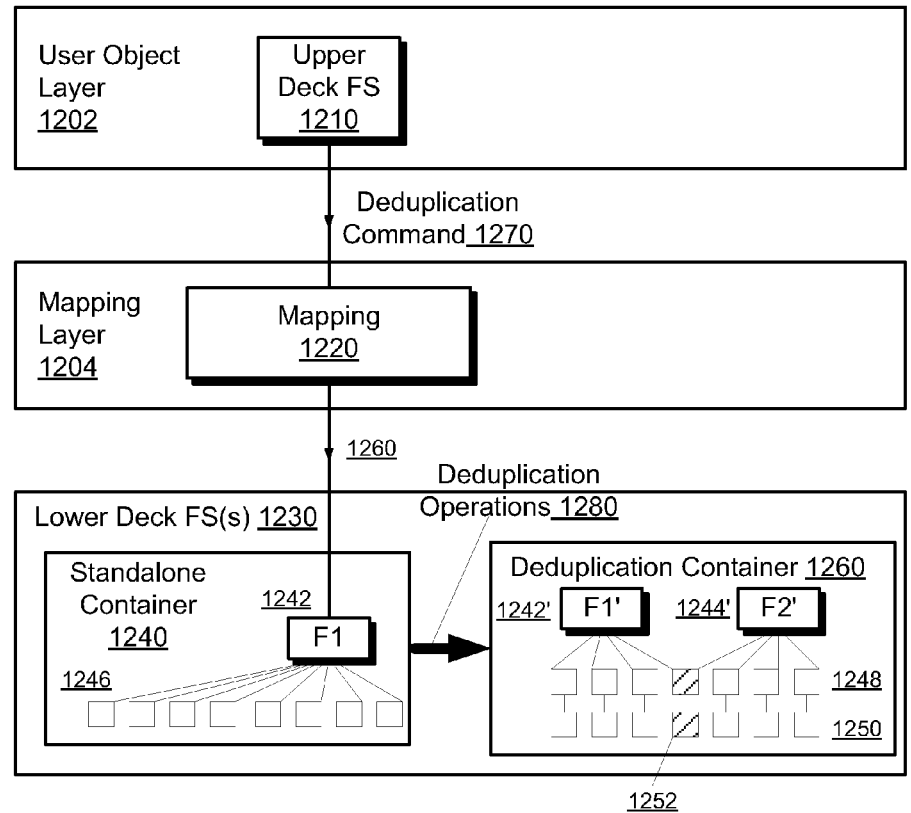
FIG. 12 is a block diagram showing an example standalone container and deduplication container in the data storage apparatus of FIG. 1.
Figure 12:
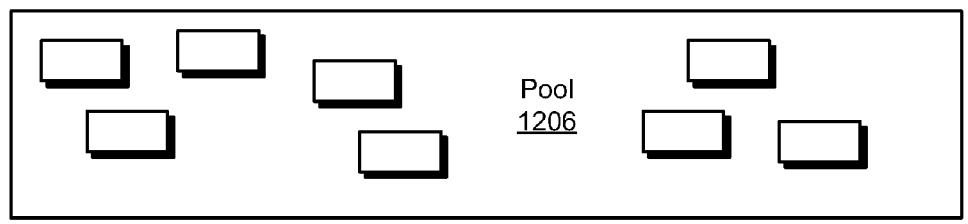

FIG. 12 illustrates an example storage processor 1200 for carrying out deduplication operations on standalone containers. As pictured in FIG. 12, storage processor 1200 includes user object layer 1202, mapping layer 1204, lower deck file system 1230, and storage pool 1206.

User object layer 1202, as shown in FIG. 12, presents underlying files representing LUNs and underlying files representing host file systems in a form recognized by the hosts (i.e., as LUNs and host file systems). For example, user object layer 1202 presents data stored in underlying files for block-based data as LUNs. User object layer 1202 also presents data stored in underlying files for file-based data as host file systems. As illustrated in FIG. 12, user object layer 1202 includes an upper-deck file system 1210 for a host file system stored in a file of the lower-deck file system(s) 1230 (described below).

Mapping layer 1204 maps host objects as presented in the user object layer 1202 to corresponding underlying files stored in one or more lower-deck file systems 1230. For LUNs, the mapping layer 1204 converts a LUN identifier and offset range to a particular file in a lower-deck file system 1230 and to a particular offset range within that file. Any set of blocks of a LUN identified in a host IO request are thus mapped to a set of blocks in the underlying file that represents the LUN. Similarly, for host file systems, the mapping layer 1204 converts a given file or directory represented in an upper-deck file system of the user object layer 1202 to a particular file in a lower-deck file system 1230 and to a particular location within the file.

The lower-deck file system layer 1230 represents LUNs and host file systems in the form of files. Any number of lower-deck file systems may be provided in the lower deck file system layer. As illustrated in FIG. 12, lower-deck file system layer 1230 includes lower deck file systems such as standalone container 1240 and deduplication container 1260. Each lower-deck file system has an inode table, which provides a unique inode for each file stored in the lower-deck file system. The inode table of each lower-deck file system stores properties of each file in the respective lower-deck file system, such as ownership and block locations at which the file's data are stored.

Standalone container 1240 is configured to include container file 1242 (labeled "F1" in FIG. 12) which is formed from storage blocks 1246. Note that, as discussed above, storage blocks 1246 are standalone and are hierarchically related. In some arrangements, standalone container also contains snapshots of file 1242.

It should be understood that files in standalone container are typically placed there to take advantage of a direct map provided by standalone blocks 1246. In this way, processing of I/O commands within standalone container 1240 is more efficient than with shared blocks. On the other hand, as discussed above, such efficiency disappears during operation involving block relocations such as deduplication.

Deduplication container 1260 contains files 1242' and 1244' formed from shared storage blocks 1250 that are hierarchically related. In some arrangements, deduplication container includes virtual block maps (VBMs) 1248 for each block of data 1250. Shown in FIG. 12 is a case in which container files 1242' and 1244' share a block 1252. In this case, the inodes of files 1242' and 1244' both point to a particular VBM (shaded) which in turn points to—and is pointed to by—a block 1252 (shaded).

It should be understood that there is only a single deduplication container per storage pool 1206, while there can be many standalone containers for storage pool 1206.

During operation, storage processor 1200 creates standalone container 1240 in lower deck file system layer 1230. Standalone container 1240 includes container file 1242 which stores upper deck file system 1210 and provides a contiguous address space for upper deck file system 1210. Container file 1242, as created, is not suitable for deduplication operations because it is formed form standalone data blocks 1246.

At some point later, storage processor 1200 receives a deduplication command 1270 identifying standalone container 1240. For example, a user on a host client of upper deck file system 1210, while initially choosing not to use deduplication facilities within storage processor 1200, has changed its mind and checks a box indicating that deduplication operations are to be performed on upper deck file system and, consequently, standalone container 1240.

In response to the deduplication command, storage processor 1200 performs a set of deduplication operations 1280 to create and store deduplication container 1260 in the data storage array in which standalone container 1240 is stored. In some arrangements, storage processor verifies whether deduplication container 1260 is already stored in the data storage array, as there may only be one deduplication container per storage pool.

In some arrangements, standalone container 1240 only contains container file 1242. In this case, then deduplication operations 1260 involve establishing a migration session for migrating container file 1242 to deduplication container 1260. As container file 1242 is migrated to deduplication container 1260, storage processor 1200 may assign VBM pointers to each block of file 1242 and perform standard deduplication operations on each block (i.e., hashing and looking the hash up in a hash table). In this case, when a VBM pointer is assigned to point to another VBM pointer rather than a data block, that data block is removed from storage as part of the deduplication process.

In other arrangements, however, standalone container also contains snapshots of file 1242. There is no teaching of performing a migration of snapshots of a container file to a deduplication pool. In such a case, performing a migration as in the case of no snapshots is infeasible. An alternative is illustrated in FIGS. 13 and 14.

Figure 13:
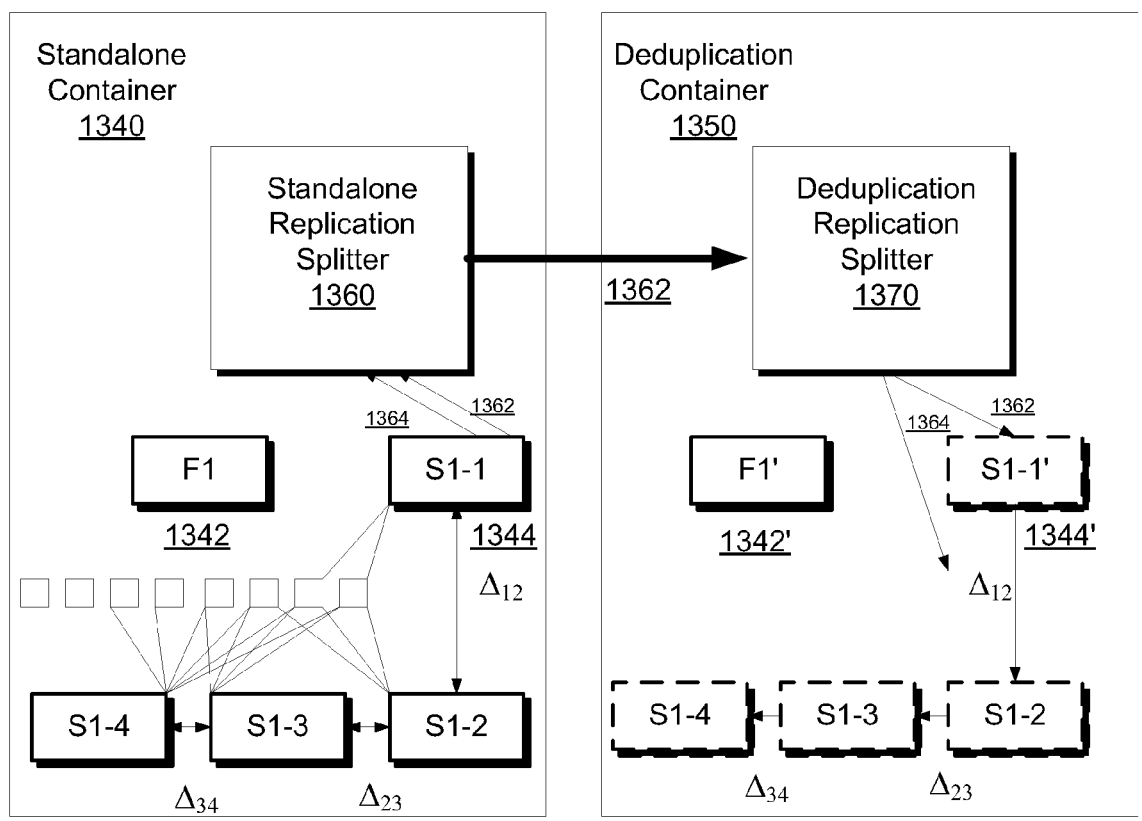
FIG. 13 is a block diagram showing an example arrangement in which snaps are preserved during a deduplication operation in the data storage apparatus of FIG. 1.
Figure 14:
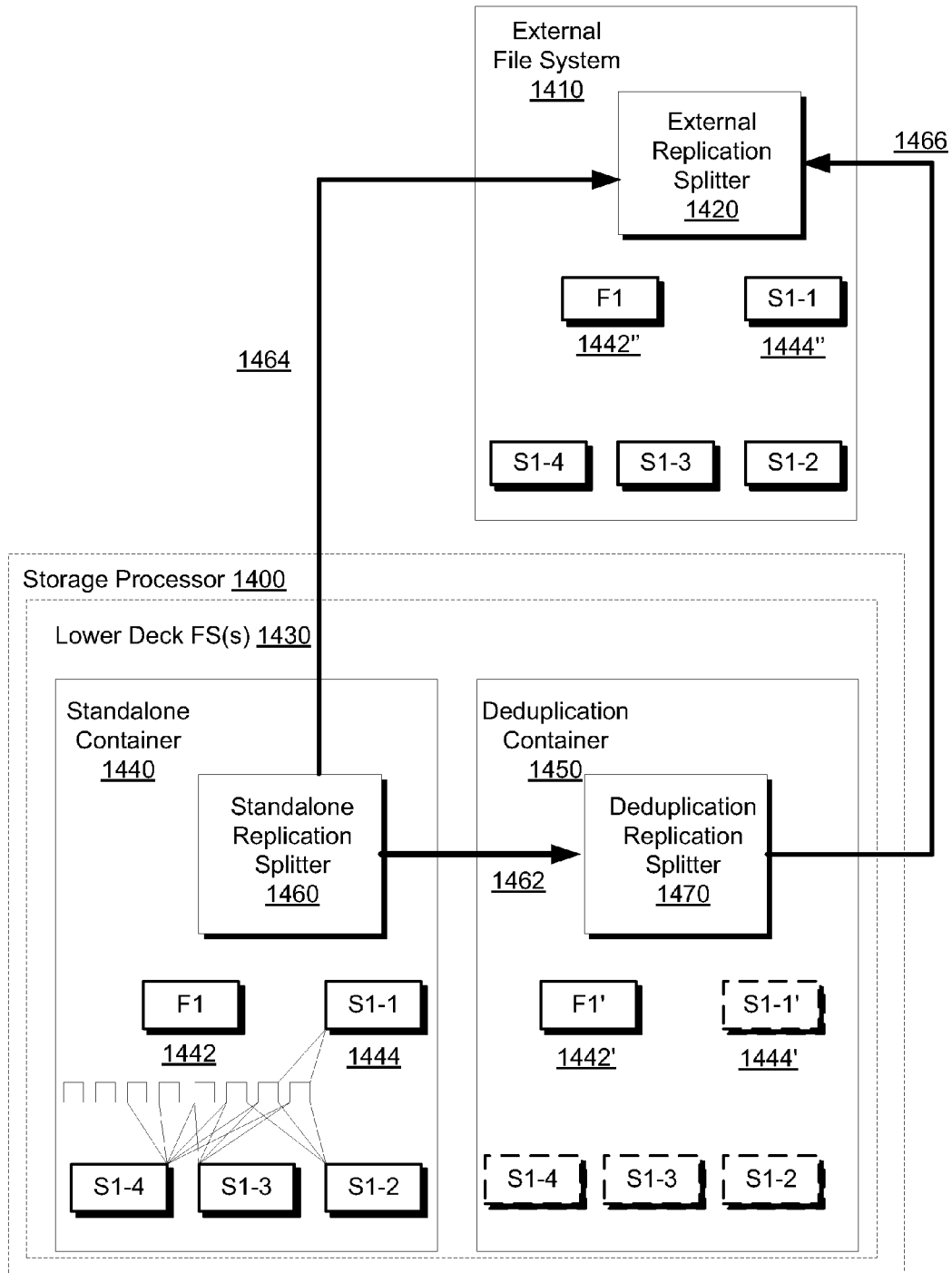
FIG. 14 is a block diagram showing an example arrangement in which a replication process is preserved during a deduplication operation in the data storage apparatus of FIG. 1.

FIG. 13 illustrates an example lower deck file system layer 1330 that includes a standalone container 1340 and a deduplication container 1350. Standalone container 1340 includes a container file 1342 and a set of snapshots 1344, labeled "S1-1," "S1-2," "S1-3," and "S1-4." Each of these snapshots have inodes pointing to different blocks of standalone data that form container file 1342 as illustrated in FIG. 13. For this reason, as discussed above, storage processor 1200 (see FIG. 12) is not enabled to migrate the contents of standalone container 1340 to deduplication container 1350.

Rather, in response to a deduplication command (e.g., deduplication command 1270, see FIG. 12), storage processor 1200 invokes a replication session 1362 between standalone container 1340 and deduplication container 1350. While snapshots 1344 may not be migrated to deduplication container 1350, they may be transferred to deduplication container 1350 via replication session 1362.

It should be understood that, in a standalone container, the blocks that are shared via snapshots are located at the same logical offsets in those files, whereas blocks shared by deduplication do not necessarily have same logical offsets.

To this end, standalone container includes a standalone replication splitter 1360, and deduplication container 1350 includes a deduplication replication splitter 1370. Each replication splitter 1360 and 1370 is enabled to for a replication session with standalone container 1340 as a source and deduplication container 1350 as a target. Each of replication splitter 1360 and 1370 is, in the example illustrated in FIG. 13, a virtual machine stored in memory of storage processor 1200 and including instructions for carrying out replication session 1362.

During an example operation, storage processor 1200 invokes replication session 1362 between splitters 1360 and 1370. Once session 1362 is invoked, storage processor 1200 replicates file 1342 to create replicated file 1342' in deduplication container 1350.

Storage processor then performs a replication 1362 on the oldest snapshot 1344, illustrated in FIG. 13 as snapshot S1-1. In finding the "oldest" snapshot, storage processor 1200 finds the snapshot 1344 that has the longest elapsed time since creation. Storage processor may retrieve such information from the snapshot inodes.

For replication session 1362, storage processor replicates the entire snapshot for only the oldest snapshot. For each subsequent snapshot, storage processor only replicates the difference between that subsequent snapshot and the previous snapshot. For example, after storage processor ensures that a replica of snapshot S1-1, S1-1', is stored in deduplication container 1350, storage processor takes a difference $\Delta_{12}$ between snapshot S1-1 and subsequent snapshot S1-2. Storage processor 1200 then performs a replication 1364 on the difference $\Delta_{12}$ and forms a replica of difference $\Delta_{12}$ in deduplication container 1350. Once this replica is stored, storage processor 1200 then adds the difference $\Delta_{12}$ to the previous snapshot replica 1344', in this case, S1-1', to form the replica of snapshot S1-2, S1-2'. In this way, each snapshot may be replicated to the deduplication pool in order of their creation.

Once all of the content of standalone container 1340, including snapshots 1344, have been replicated, storage processor removes standalone container 1340 from storage.

In some arrangements, standalone container 1340 may also have external replication sessions in progress at the time that deduplication operations 1260 are invoked. In this case, a migration of standalone container 1340 to deduplication container 1350 would also result in a loss of such external replication sessions. An alternative using a replication session between standalone container 1340 and deduplication container 1350 is discussed below in connection with FIG. 14.

FIG. 14 illustrates an example storage processor 1400 which has a lower deck file system layer 1430 which in turn has, as before, a standalone container 1440 and a deduplication container 1450. Each of the containers has a replication splitter 1460 and 1470, respectively, and is generally configured as described above in connection with FIG. 13.

Nevertheless, standalone container 1440 has an external replication session 1464 with external file system 1410. For example, external file system 1410 is stored on a storage array remote from storage processor 1400. Such external replication sessions 1464 are common in establishing failover points in case of a catastrophic event for storage processor 1400 or its associated storage.

External replication session 1464 includes a replication configuration file that specifies parameter values that govern how external replication session proceeds. For example, a replication configuration file may specify the frequency with which snapshots are replicated. Further, a replication configuration file may specify whether replication session 1464 is part of a synchronous or asynchronous replication scheme.

In preserving external replication session in the face of a deduplication operation that transfers the contents of standalone container 1440 to deduplication container 1450, storage processor 1400 produces a replica 1466 of external replication session 1464 using replication session 1462.

During an example operation, storage processor establishes replication session 1462 between standalone container 1440 and deduplication container 1450. In this way, storage processor 1400 replicates file 1442 and snapshots 1444 to deduplication container 1450 via splitters 1460 and 1470, as described above.

Storage processor 1400 then pauses external replication session 1464. This pausing is done so that storage processor 1400 may replicate the replication configuration file to deduplication container 1450. Once external replication session 1464 is paused, storage processor then replicates the replication configuration file to deduplication container 1450 via replication session 1462.

As soon as the replication configuration file is replicated in deduplication container 145, storage processor 1400 creates a new external replication session 1466 between deduplication container 145 (source) and external file system 1410. External replication session 1466 is nearly identical to external replication session 1464, except that it originates from deduplication container 1450 rather than standalone container 1440.

Once external replication session 1466 has been established, storage processor 1400 terminates external replication session 1464 and removes standalone container 1440. In this way, snapshots and replication sessions are preserved upon the invocation of a deduplication command. Alternatively, storage processor 1400 may avoid imposing a pausing step by establishing a synchronous replication session between standalone container 1440, deduplication container 1450, and external file system 1410. In this way, storage processor 1400 may replicate the replication configuration file to deduplication container 1450 and external file system 1410 simultaneously. Storage processor 1400 may then impose a failover condition so that the new replication source becomes deduplication container 1450. In this case, storage processor 1400 is able to establish replication session 1466 without pausing. After external replication session 1466 has been established, storage processor 1400 terminates external replication session 1464 and removes standalone container 1440.

FIG. 15 illustrates a method 1500 of performing deduplication on a data storage array that stores host data, including steps 1502, 1504, 1506.

In step 1502, a standalone container is initially stored on the data storage array, the standalone container including container files which are formed by standalone blocks storing the host data and which are hierarchically related to each other.

In step 1504, a deduplication command which identifies the standalone container is received.

In step 1506, a set of deduplication operations to create and store a deduplication container on the data storage array is performed in response to the deduplication command, the deduplication container including container files which are formed by deduplication blocks storing the host data and which are hierarchically related to each other.

Those skilled in the art will therefore understand that various changes in form and detail may be made to the embodiments disclosed herein without departing from the scope of the invention.

What is claimed is:

1. A method of performing deduplication on a data storage array that stores host data, the method comprising:
   initially storing a standalone container on the data storage array, the standalone container including container files which are formed by standalone blocks storing the host data and which are hierarchically related to each other;
   receiving a deduplication command which identifies the standalone container; and
   in response to the deduplication command, performing a set of deduplication operations to create and store a deduplication container on the data storage array, the deduplication container including container files which are formed by deduplication blocks storing the host data and which are hierarchically related to each other,
   wherein each of the standalone container and the deduplication container is a lower deck file system in the data storage array, each container file of the standalone container and the deduplication container representing an upper deck file system for a host file system accessible to a respective host computer of a set of host computers;
   wherein the deduplication command which identifies the standalone container is received from a host computer of the set of host computers.

2. A method as in claim 1,
   wherein performing the set of deduplication operations includes:
   assigning a virtual block map (VBM) pointer to each standalone block that is not marked as a duplicate to form a deduplication block,
   for each standalone block marked as a duplicate, i) assigning a VBM pointer to another VBM pointer that points to a standalone block that is not marked as a duplicate and contains the same host data as that standalone block, and ii) freeing that standalone block.

3. A method as in claim 2,
   wherein performing the set of deduplication operations further includes:
   establishing a replication session between the standalone container and the deduplication container, and
   after establishing the replication session, replicating the container file of the standalone container in the deduplication container; and wherein freeing each standalone block includes:
removing the standalone container from the data storage array.

4. A method as in claim 3,
wherein the standalone container includes a particular container file and a set of snapshots of the particular container file, each of the set of snapshots being identified with an elapsed time since creation;
wherein establishing the replication session includes:
locating an oldest snapshot of the set of snapshots, the oldest snapshot being identified with the longest elapsed time since creation, and
identifying subsequent snapshots in descending order of elapsed time since creation.

5. A method as in claim 4,
wherein replicating the full contents of the standalone container in the deduplication container includes:
replicating the oldest snapshot in the deduplication container;
for each subsequent snapshot, i) forming a difference between that subsequent snapshot and the previous snapshot, ii) replicating the difference in the deduplication container, and iii) adding the replicated difference to the replicated previous snapshot to form a replicated subsequent snapshot; and
wherein removing the standalone container from the data storage array includes:
deleting the set of snapshots from the standalone container.

6. A method as in claim 4,
wherein the standalone container includes an external replication session having a replication configuration between the standalone container and a replicated standalone container on another data storage array;
wherein the method further comprises:
prior to removing the standalone container from the data storage array, i) pausing the external replication session and ii) copying the replication configuration of the external replication session to the deduplication container;
deleting the replication configuration from the standalone container; and
establishing another external replication session between the deduplication container and the replicated standalone container.

7. A method as in claim 4,
wherein the standalone container includes an external replication session having a replication configuration between the standalone container and a replicated standalone container on another data storage array
wherein the standalone container acts as a source file system and the other data storage array as a target file system, the standalone container having a replication configuration between the standalone container and the replicated standalone container on another data storage array;
wherein establishing the replication session includes:
setting up a symmetric replication session involving the external replication session and the deduplication container;
wherein the method further comprises:
prior to removing the standalone container from the data storage array, establishing a failover condition in the standalone container, the failover condition causing the deduplication container to act as the source file system; and
deleting the replication configuration from the standalone container.

8. A method as in claim 1,
wherein the data storage array includes an upper deck file system accessible to a host and a lower deck file system including the standalone container and the deduplication container, the upper deck file system being stored in the form of a container file of the standalone container;
wherein receiving the deduplication command which identifies the standalone container includes:
obtaining a message from the host indicating that the container file of the standalone container is to be converted into a container file in the deduplication container.

9. A method as in claim 8,
wherein the lower deck file system is provisioned blocks of data from a storage pool, the storage pool containing all blocks of storage of the data storage array, a single deduplication container being stored per storage pool; and
wherein performing the set of deduplication operations to create and store the deduplication container on the data storage array includes:
prior to creating the deduplication container, verifying whether there is another deduplication container stored in the lower deck file system.

10. A data storage apparatus constructed and arranged to store host data, the data storage system comprising:
a set of storage devices; and
a storage processor, the storage processor including:
memory; and
a set of processors coupled to the memory to form controlling circuitry, the controlling circuitry constructed and arranged to:
initially store a standalone container on the data storage array, the standalone container including container files which are formed by standalone blocks storing the host data and which are hierarchically related to each other;
receive a deduplication command which identifies the standalone container; and
in response to the deduplication command, perform a set of deduplication operations to create and store a deduplication container on the data storage array, the deduplication container including container files which are formed by deduplication blocks storing the host data and which are hierarchically related to each other,
wherein each of the standalone container and the deduplication container is a lower deck file system in the data storage array, each container file of the standalone container and the deduplication container representing an upper deck file system for a host file system accessible to a respective host computer of a set of host computers;
wherein the deduplication command which identifies the standalone container is received from a host computer of the set of host computers.

11. A data storage apparatus as in claim 10,
wherein performing the set of deduplication operations includes:
assigning a virtual block map (VBM) pointer to each standalone block that is not marked as a duplicate to form a deduplication block,
for each standalone block marked as a duplicate, i) assigning a VBM pointer to another VBM pointer that points to a standalone block that is not marked as a duplicate and contains the same host data as that standalone block, and ii) freeing that standalone block.

12. A data storage apparatus as in claim 11,
wherein performing the set of deduplication operations further includes:
establishing a replication session between the standalone container and the deduplication container, and
after establishing the replication session, replicating the container file of the standalone container in the deduplication container; and
wherein freeing each standalone block includes:
removing the standalone container from the data storage array.

13. A data storage apparatus as in claim 12,
wherein the standalone container includes a particular container file and a set of snapshots of the particular container file, each of the set of snapshots being identified with an elapsed time since creation;
wherein establishing the replication session includes:
locating an oldest snapshot of the set of snapshots, the oldest snapshot being identified with the longest elapsed time since creation, and
identifying subsequent snapshots in descending order of elapsed time since creation.

14. A data storage apparatus as in claim 13,
wherein replicating the full contents of the standalone container in the deduplication container includes:
replicating the oldest snapshot in the deduplication container;
for each subsequent snapshot, i) forming a difference between that subsequent snapshot and the previous snapshot, ii) replicating the difference in the deduplication container, and iii) adding the replicated difference to the replicated previous snapshot to form a replicated subsequent snapshot; and
wherein removing the standalone container from the data storage array includes:
deleting the set of snapshots from the standalone container.

15. A data storage apparatus as in claim 13,
wherein the standalone container includes an external replication session having a replication configuration between the standalone container and a replicated standalone container on another data storage array;
wherein the controlling circuitry is further constructed and arranged to:
prior to removing the standalone container from the data storage array, i) pause the external replication session and ii) copy the replication configuration of the external replication session to the deduplication container;
delete the replication configuration from the standalone container; and
establish another external replication session between the deduplication container and the replicated standalone container.

16. A data storage apparatus as in claim 13,
wherein the standalone container includes an external replication session having a replication configuration between the standalone container and a replicated standalone container on another data storage array
wherein the standalone container acts as a source file system and the other data storage array as a target file system, the standalone container having a replication configuration between the standalone container and the replicated standalone container on another data storage array;
wherein establishing the replication session includes:
setting up a symmetric replication session involving the external replication session and the deduplication container;
wherein the method further comprises:
prior to removing the standalone container from the data storage array, establishing a failover condition in the standalone container, the failover condition causing the deduplication container to act as the source file system; and
deleting the replication configuration from the standalone container.

17. A data storage apparatus as in claim 10,
wherein the data storage array includes an upper deck file system accessible to a host and a lower deck file system including the standalone container and the deduplication container, the upper deck file system being stored in the form of a container file of the container file system;
wherein receiving the deduplication command which identifies the standalone container includes:
obtaining a message from the host indicating that the container file of the standalone container is to be converted into a container file of the deduplication container.

18. A computer program product having a non-transitory, computer-readable storage medium which stores instructions which, when executed by a computer, cause the computer to perform a method of performing deduplication on a data storage array that stores host data, the method comprising:
initially storing a standalone container on the data storage array, the standalone container including container files which are formed by standalone blocks storing the host data and which are hierarchically related to each other;
receiving a deduplication command which identifies the standalone container; and
in response to the deduplication command, performing a set of deduplication operations to create and store a deduplication container on the data storage array, the deduplication container including container files which are formed by deduplication blocks storing the host data and which are hierarchically related to each other,
wherein each of the standalone container and the deduplication container is a lower deck file system in the data storage array, each container file of the standalone container and the deduplication container representing an upper deck file system for a host file system accessible to a respective host computer of a of host computers;
wherein the deduplication command which identifies the standalone container is received from a host computer of the set of host computers.

19. A computer program product as in claim 18,
wherein performing the set of deduplication operations includes:
assigning a virtual block map (VBM) pointer to each standalone block that is not marked as a duplicate to form a deduplication block,
for each standalone block marked as a duplicate, i) assigning a VBM pointer to another VBM pointer that points to a standalone block that is not marked as a duplicate and contains the same host data as that standalone block, and ii) freeing that standalone block.

20. A computer program product as in claim 19,
wherein performing the set of deduplication operations further includes:

establishing a replication session between the standalone container and the deduplication container, and after establishing the replication session, replicating the container file of the standalone container in the deduplication container; and wherein freeing each standalone block includes:

removing the standalone container from the data storage array.

21. A method as in claim 1, wherein each of the standalone container and the deduplication container includes an inode table containing inode numbers;

wherein each container file of the standalone container includes an inode having an inode number contained in the inode table of the standalone container;

wherein each container file of the deduplication container includes an inode having an inode number contained in the inode table of the deduplication container; and wherein the method further comprises, in response to performing the set of deduplication operations, updating the respective inode tables of the standalone container and the deduplication container.

22. A method as in claim 1, wherein each block of each container file of the standalone container is fully owned by that container file and is accessible to only to snapshots of that container file; and wherein a block of a container file of the deduplication container is a shared block accessible to another container file of the deduplication container, the other container file not being a snapshot of the container file.

* * * * *